(12) United States Patent
Lange et al.

(10) Patent No.: US 12,128,941 B2
(45) Date of Patent: Oct. 29, 2024

(54) HANDLING SYSTEM FOR CONTAINER IN A VEHICLE AND A VEHICLE HAVING SUCH A SYSTEM

(71) Applicant: Airbus Operations GmbH, Hamburg (DE)

(72) Inventors: Roland Lange, Hamburg (DE); Andreas Wietzke, Hamburg (DE); Jan Lehnert, Hamburg (DE); Artjom Sotnikov, Hamburg (DE); Mika Sachse, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 394 days.

(21) Appl. No.: 17/536,057

(22) Filed: Nov. 28, 2021

(65) Prior Publication Data

US 2022/0153329 A1    May 19, 2022

Related U.S. Application Data

(63) Continuation of application No. PCT/EP2020/073717, filed on Aug. 25, 2020.

(30) Foreign Application Priority Data

Aug. 28, 2019 (DE) ...................... 10 2019 123 107.8

(51) Int. Cl.
*B62B 3/14* (2006.01)
*B64D 11/00* (2006.01)
*B64D 11/04* (2006.01)

(52) U.S. Cl.
CPC ........ *B62B 3/1404* (2013.01); *B64D 11/0007* (2013.01); *B64D 11/04* (2013.01)

(58) Field of Classification Search
CPC ... A47B 53/00; A47F 1/04; A47F 1/12; A47F 1/121; A47F 1/123; A47F 1/125;
(Continued)

(56) References Cited

U.S. PATENT DOCUMENTS 2,654,489 A * 10/1953 Ingold ..................... B42F 17/00
                                                                104/162
2,923,584 A *  2/1960 Broderick, Jr. ........ A47B 53/00
                                                                312/334.25

(Continued)

FOREIGN PATENT DOCUMENTS

DE     202012102254 U1   9/2013
EP         1955894 A2    8/2008
(Continued)

OTHER PUBLICATIONS

German Search Report for Application No. 102019123107 dated Aug. 19, 2020.
(Continued)

*Primary Examiner* — Joshua E Rodden
(74) *Attorney, Agent, or Firm* — KDW Firm PLLC

(57) ABSTRACT

A handling system for a receptacle space in a vehicle for storage for containers. A linear guide is on an inner wall of the receptacle space. The linear guide guides at least one carrier element in the movement direction of the container, wherein the storage position of the container is provided having the rear wall thereof in the region of the rear wall of the receptacle space. The removal position is provided in the region of an insertion opening, arranged opposite the rear wall. The at least one carrier element is operatively connected to at least one spindle nut of a spindle drive. The container is thus moved linearly from a stowage and storage position to a removal position and vice versa.

9 Claims, 10 Drawing Sheets

(58) Field of Classification Search
CPC ........ A47F 1/126; A47F 1/128; B62B 3/1404; B64D 11/0007; B64D 11/04
USPC ................ 312/198, 201, 202, 319.7; 211/17
See application file for complete search history.

(56) References Cited

U.S. PATENT DOCUMENTS

| | | | | | |
|---|---|---|---|---|---|
| 3,168,361 | A | * | 2/1965 | Naito | G06K 17/0003 104/162 |
| 3,597,034 | A | * | 8/1971 | Wetzler | A47B 53/02 312/199 |
| 5,669,682 | A | * | 9/1997 | Janson | A47B 53/02 312/201 |
| 5,938,047 | A | * | 8/1999 | Ellis | B65G 1/0442 414/331.11 |
| 6,152,287 | A | * | 11/2000 | Luria | B65G 1/133 198/465.1 |
| 8,662,606 | B2 | * | 3/2014 | Santmyer | A47B 88/57 700/242 |
| 11,518,518 | B2 | * | 12/2022 | Bauer | B64D 11/04 |
| 11,597,518 | B2 | * | 3/2023 | Bauer | B64D 11/0007 |
| 2012/0209426 | A1 | * | 8/2012 | Lockwood | G07F 17/10 700/240 |
| 2014/0166806 | A1 | * | 6/2014 | Durand | B64D 11/0007 244/118.1 |
| 2016/0007769 | A1 | * | 1/2016 | Gray | A47F 1/128 221/1 |
| 2017/0023027 | A1 | * | 1/2017 | Claflin | B64D 11/003 |
| 2017/0166310 | A1 | * | 6/2017 | Wallbott | B25J 1/04 |
| 2019/0031348 | A1 | * | 1/2019 | Bajorat | B64D 11/0007 |
| 2019/0061950 | A1 | * | 2/2019 | Hoogeveen | B64D 11/04 |
| 2020/0079633 | A1 | * | 3/2020 | Rechberg | B64D 11/04 |
| 2021/0047042 | A1 | * | 2/2021 | Tracey | B64D 11/0007 |
| 2022/0153329 | A1 | * | 5/2022 | Lange | B64D 11/04 |
| 2023/0071125 | A1 | * | 3/2023 | Tracey | B64D 11/0007 |

FOREIGN PATENT DOCUMENTS

| | | |
|---|---|---|
| WO | WO 2014/125 046 A1 | 8/2014 |
| WO | WO 2016/034 531 A1 | 3/2016 |

OTHER PUBLICATIONS

International Search Report for Application No. PCT/EP2020/073717 dated Nov. 16, 2020.

* cited by examiner

HANDLING SYSTEM FOR CONTAINER IN A VEHICLE AND A VEHICLE HAVING SUCH A SYSTEM

CROSS-REFERENCE TO RELATED APPLICATIONS

This application is a continuation of and claims priority to Application No. PCT/EP2020/073717 filed Aug. 25, 2020 which claims priority to German Patent Application No. DE 10 2019 123 107.8 filed Aug. 28, 2019, the entire disclosures of which are incorporated by reference herein.

TECHNICAL FIELD

The disclosure herein relates to a handling system for containers in a vehicle and to a vehicle having such a system.

BACKGROUND

Vehicles which are used to transport a plurality of passengers are conventionally equipped with cabins having passenger seats, one or more on-board toilets, and optionally one or more galleys. In particular when making galleys in commercial aircraft more compact, there are designs that use parking spaces for trolleys in which a plurality of trolleys are arranged one behind the other. Conventionally, this relates to the use of trolleys according to ATLAS, ARINC or KSSU standards, and to the combined use of a trolley having a full depth (full-size trolley) and a trolley having a half depth (half-size trolley) or two trolleys having a full depth (two full-size trolleys). For supply containers which have to be stored in the galley as boxes, due to the depth for the storage space, it can also be possible to stow two or more boxes one behind the other.

To remove trolleys from such a parking space, a hand grip located on a front side of the trolley is conventionally gripped by a user and pulled out of the parking space. For this purpose, the trolley is equipped with rollers which are provided for movement in the kitchen region and also to move the trolley in the longitudinal corridor of the aircraft from one row of seats to another for the serving process in the aircraft cabin. For trolleys in the rear parking spaces, a removal device is necessarily provided. In particular, when a full-size trolley is parked in a rear parking space, the flight attendants may need to apply greater force, and in terms of accessibility, it is also more difficult to transport the full-size trolley out of the rear parking space.

Such removal devices for trolleys are known from WO 2016 034 531 A1 or WO 2014 125 046 A1. In these documents, bars and devices for engaging in the body of the trolley are provided for moving the trolley forward and backward in the parking space region. However, the usability and handling of a trolley can be improved for precisely those parking spaces which are arranged one behind the other.

SUMMARY

To make galleys even more compact, it could be helpful to arrange catering containers, such as trolleys or boxes, one behind the other in a receiving space. However, this is not optimal in terms of handling, since a rear trolley or a rear box can be reached by cabin crew only with great difficulty, since it is located at a relatively great distance from an insertion opening of the parking space.

One problem addressed by the disclosure herein is therefore that of proposing a device or galley by which catering containers arranged one behind the other in a receiving space are easy for cabin crew to handle so that in particular catering containers arranged at the back of a receiving space are as easy to reach as possible.

This problem is solved by a handling system for catering containers in a vehicle as disclosed herein. Advantageous embodiments and developments are disclosed herein. The use of such a handling system is not limited to catering containers, containers for other purposes can also be moved using the handling system according to the disclosure herein.

A handling system for a receiving space in a vehicle for storing containers is proposed which provides a linear guide arranged on a side wall or a lower surface of a cover plate of the receiving space. The linear guide guides at least one driver element in the movement direction of the container, wherein the storage position of the container is provided with the rear wall thereof in the region of the rear wall of the receiving space, and the removal position is provided in the region of an insertion opening, arranged opposite the back wall. The at least one driver element is operatively connected to at least one spindle nut of a spindle drive. The container is linearly moved thereby from a stowage and storage position of the container into a removal position of the container and vice versa.

The rear wall of the receiving space arranged opposite the insertion opening or an end stop is a rear limit of a parking space in the receiving space which a rearmost container abuts or comes into abutment with or adjoins. This corresponds to the storage position of the supply container. The size and shape of the container can be selected according to requirements in the vehicle. If the vehicle is in the form of a commercial aircraft, trolleys according to relevant standards, for example the ATLAS standard, can be used. In addition, the advantages according to the disclosure herein are particularly considerable when the rollable containers have a depth which is greater than 30 to 40 cm. Especially in the case of a full-size trolley which has a length of approximately 80 to 85 cm.

In one preferred embodiment, the receiving space is provided with a front parking space and a rear parking space for receiving at least two containers arranged one behind the other, wherein the linear guide extends substantially from the insertion opening in the region of the front parking space substantially as far as the rear wall of the receiving space. After a conventional removal of a front container which is arranged at the insertion opening, by using the handling system, the rear container which is arranged at a considerable distance from the insertion opening inside the receiving space can be removed.

For supply containers, for example trolleys, which are arranged in the rear parking spaces of a galley in a vehicle, the handling system according to the disclosure herein is preferably provided. In particular when a full-size trolley is parked in a rear parking space, it is a great relief for the flight attendants to be able to position the relatively heavy containers in an easily reachable access region and to transport these containers out of the rear parking space in a simple manner by the handling system.

The spindle drive can preferably be provided with at least one threaded spindle. An individual threaded spindle which is operatively connected to a spindle nut can also be provided to convert a rotational movement into a linear movement to move the at least one driver element. Alternatively, it is also possible to provide two threaded spindles extending in parallel, between which the at least one driver element is mounted. It is possible to choose between two possible designs of the spindle drive according to the available installation space.

If a narrower design is advantageous, it is possible to change the construction of the spindle drive. However, this is to be dimensioned on the basis of the loads to be taken into account, occurring forces and torques, and handling forces to be used. The spindle drive according to a second embodiment is equipped with two threaded spindles which are operatively connected by a gear drive.

In order to safely move a supply container having a corresponding longitudinal extent along the linear guide, more than just one driver element is provided. The at least one driver element, together with a front driver, forms a driver assembly. Preferably, front and rear drivers are interconnected by a carrier plate, this driver assembly being movable in the linear guide.

The front driver can be designed to be rotatable or slidable so that it can be removed from the movement space when the supply container is moved into the receiving space.

In one preferred embodiment, the spindle drive can be driven by a crank drive. For this purpose, the threaded spindle is preferably designed as a trapezoidal spindle having a gradient of from 25 mm to 100 mm. For the use case of a supply container of a "full-size trolley" used in the galley of an aircraft, a gradient of from 40 mm to 80 mm can be advantageous. This allows a linear movement which moves a container from the front parking space to the storage position in the rear parking space or vice versa, with correspondingly few rotations of the hand crank.

For this purpose, the handling system can advantageously be equipped with a crank drive, wherein the crank drive has a connecting rod and a hand crank, and the connecting rod is connected to at least one threaded spindle for conjoint rotation.

In one alternative embodiment, it is possible to provide the spindle drive with a spindle motor and thus bring about the rotation of the threaded spindle. Electric motor drives are conceivable for this purpose.

The disclosure herein further relates to a vehicle, in particular a vehicle comprising a cabin and a cabin monument located therein, which has a handling system according to the preceding description.

BRIEF DESCRIPTION OF THE DRAWINGS

Further features, advantages and possible applications of the disclosure herein can be found in the following description of the example embodiments and the drawings. In this case, all the features described and/or depicted, per se and in any desired combination, form the subject matter of the disclosure herein regardless of the formulation thereof in the individual claims or the dependency references thereof. Furthermore, in the drawings, like reference signs represent like or similar objects.

DETAILED DESCRIPTION

Figure 1:
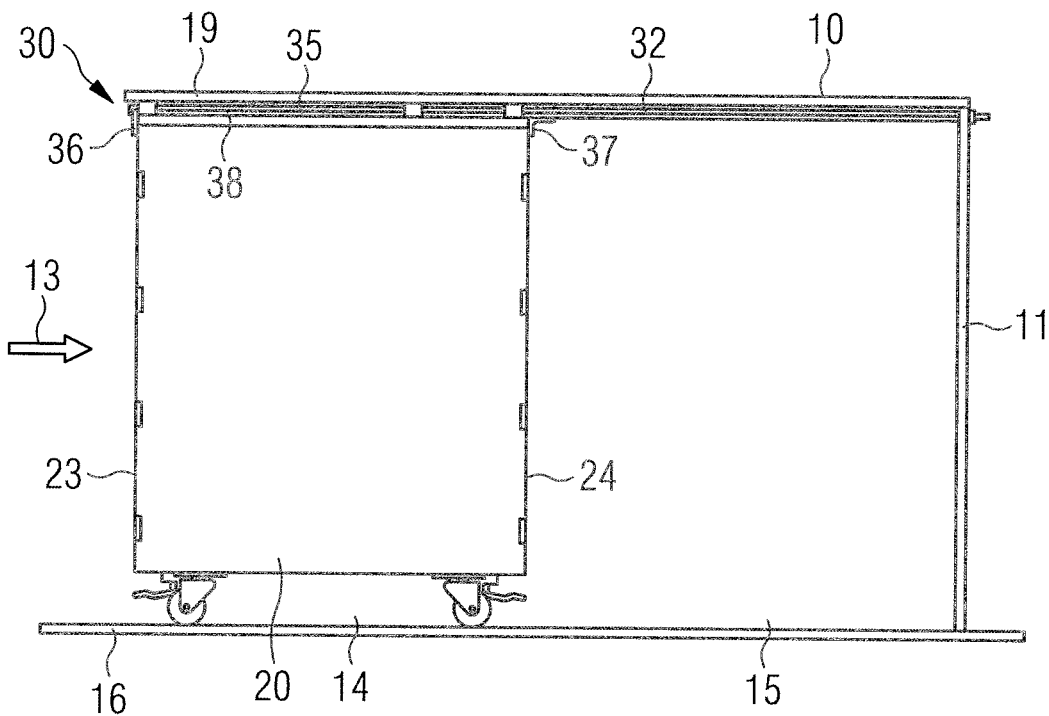
FIGS. 1 and 2 are side views of a receiving space for two supply containers arranged one behind the other in two trolley parking spaces arranged one behind the other.
Figure 2:
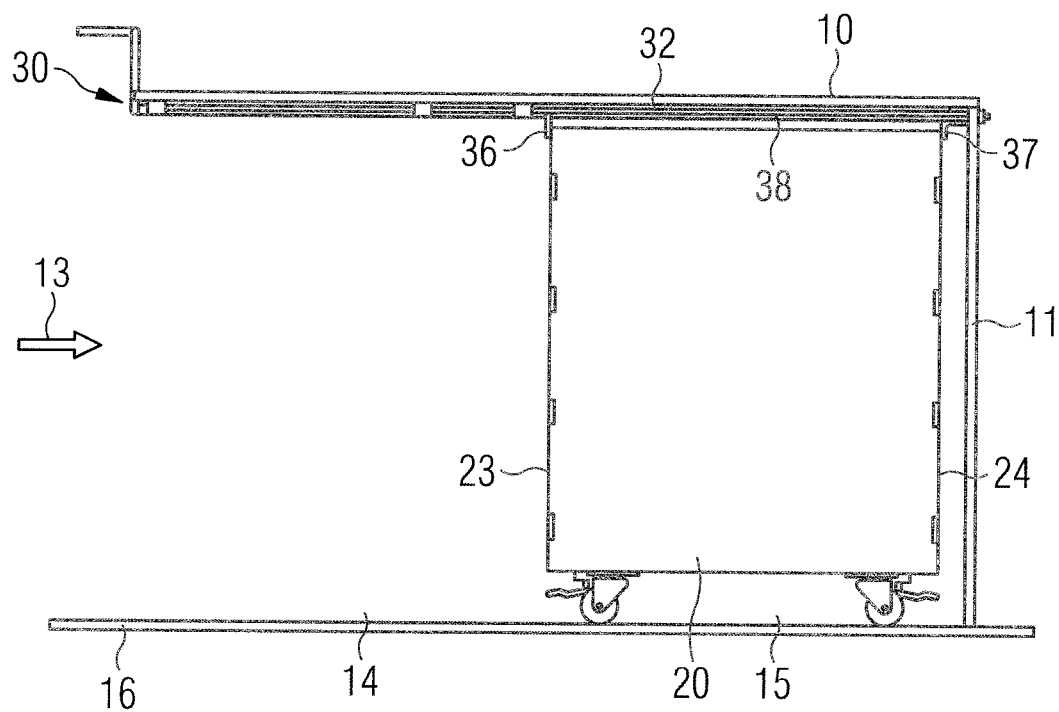

FIGS. 1 and 2 show a receiving space 10 comprising two trolley parking spaces 14 and 15 arranged one behind the other. Rollable supply containers 20 can be parked and secured in these trolley parking spaces.

For example, in this example embodiment, the vehicle is a commercial aircraft, and therefore the rollable supply containers 20 are in the form of trolleys. In this case, these are what are known as "full-size trolleys", that is to say trolleys having a full depth of approximately 80 cm. The receiving space 10 is conventionally completely closed and accessible via an insertion opening 13. This space can be a component of a galley. It comprises a bottom 16. This bottom 16 can be part of an aircraft cabin floor or a floor of the galley. For storage, the supply containers 20 are inserted in the receiving space 10 via the insertion opening 13 (denoted by an arrow symbol).

The rear trolley parking space 15 is provided in the receiving space 10 shown in such a way that a rear supply container is arranged with the rear container wall 24 thereof adjacent to or adjoining the rear wall 11 of the receiving space 10 in the storage position. The front trolley parking space 14 and the rear trolley parking space 15 are aligned along the same longitudinal axis. When the receiving space 10 is loaded, the front supply container 20 is thus positioned precisely in front of the rear supply container (not shown) from the perspective of the insertion opening so that the rear supply container can be removed from the storage position only when the front supply container 20 is removed, and thus the front trolley parking space 14 is free. Access via the insertion opening 13 to the rear trolley parking space 15 is difficult or even impossible without a tool due to the limited arm reach of the flight attendants during handling. Even if this arrangement of trolley parking spaces in a commercial aircraft is not preferable in terms of usability, construction constraints can lead to this arrangement in order to contribute to an optimized use of space in the limited space of a commercial aircraft when supply containers of this type can also be arranged one behind the other.

To allow the supply container 20 to be removed from or parked in the rear parking space 15, a handling system 30 according to the disclosure herein is provided for this parking space 15. This first embodiment of the handling system 30 basically comprises a linear guide 32. This guide is arranged in the region of the cover plate 19 of the receiving space 10. The linear guide 32 is attached to the cover plate 19 by attachment points.

The guide is preferably screwed onto the lower surface of the cover plate 19. The attachment takes place on the lower surface of the cover plate 19, thus, in a way, on an inner wall of the receiving space 10. When using the receiving space 10 in a galley of an aircraft, the cover plate 19 is simultaneously also the worktop of the galley. The linear guide 32 makes it possible for at least one driver 36 to move along the linear guide 32, which preferably engages with the front container wall 23 of the container 20 from above and thus moves the container 20 from the front parking space 14 to the rear parking space 15. The front driver 36 is preferably connected to a rear driver 37 by a carrier plate 38. These components form the movable sliding element on or in the linear guide 32 as a driver assembly 35.

Figure 3:
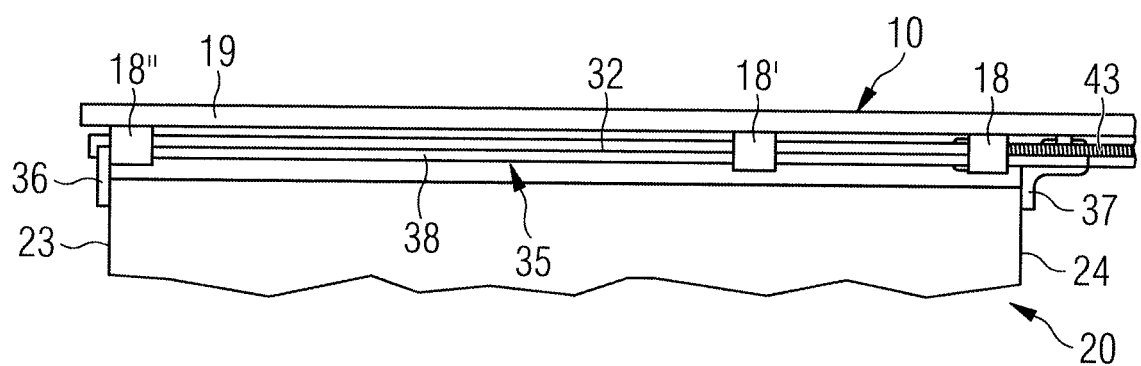
FIG. 3 is a side view of the handling system in the receiving space in the region of the cover plate.
Figure 15:
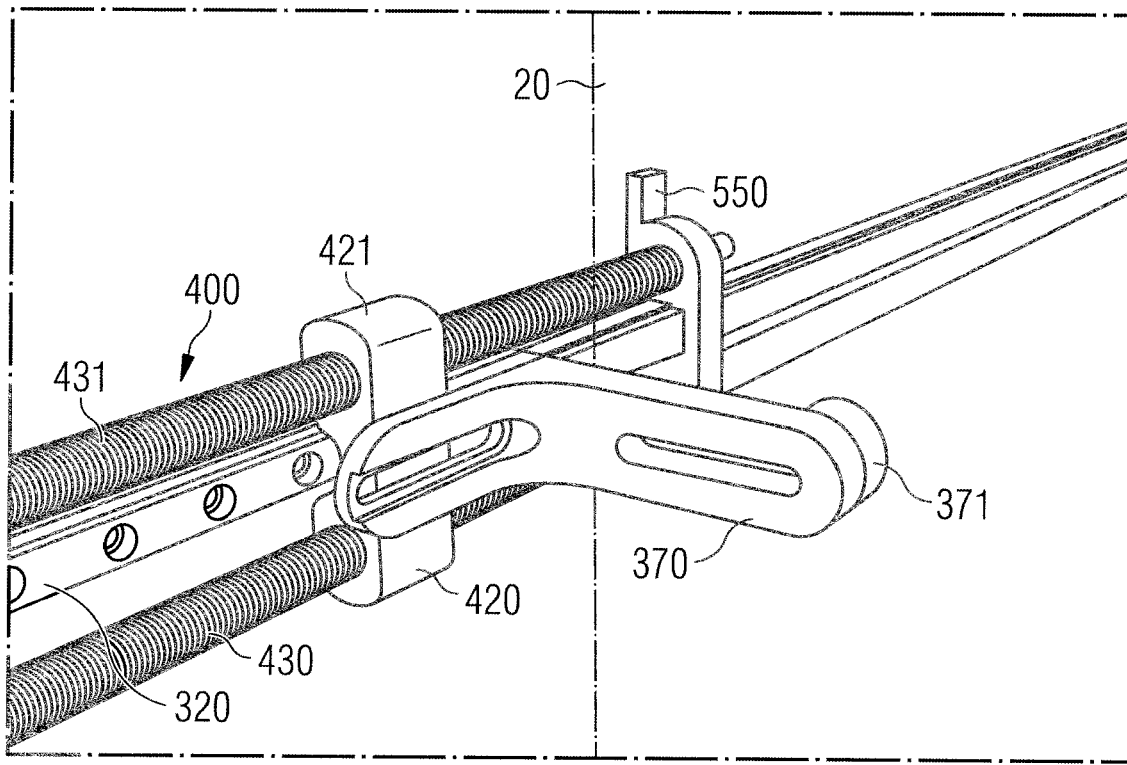

FIG. 3 is a cut-out side view of the handling system 30 in the receiving space 10 in the region of the cover plate 19. The driver assembly 35 is preferably mounted on at least two slots in the linear guide 32. Together with the rear driver 37, the driver assembly 35 simultaneously comprises a stop for the supply container 20. To position the supply container in the front parking space 14 in the receiving space 10, the rear wall 24 of the supply container 20 is inserted as far as the driver 37. This supply container can be designed to be adjustable, as shown in FIG. 15. The front driver 36 can then be brought into the abutment position with the supply container 20, preferably with the front wall 23, by sliding or rotating.

Figure 4:
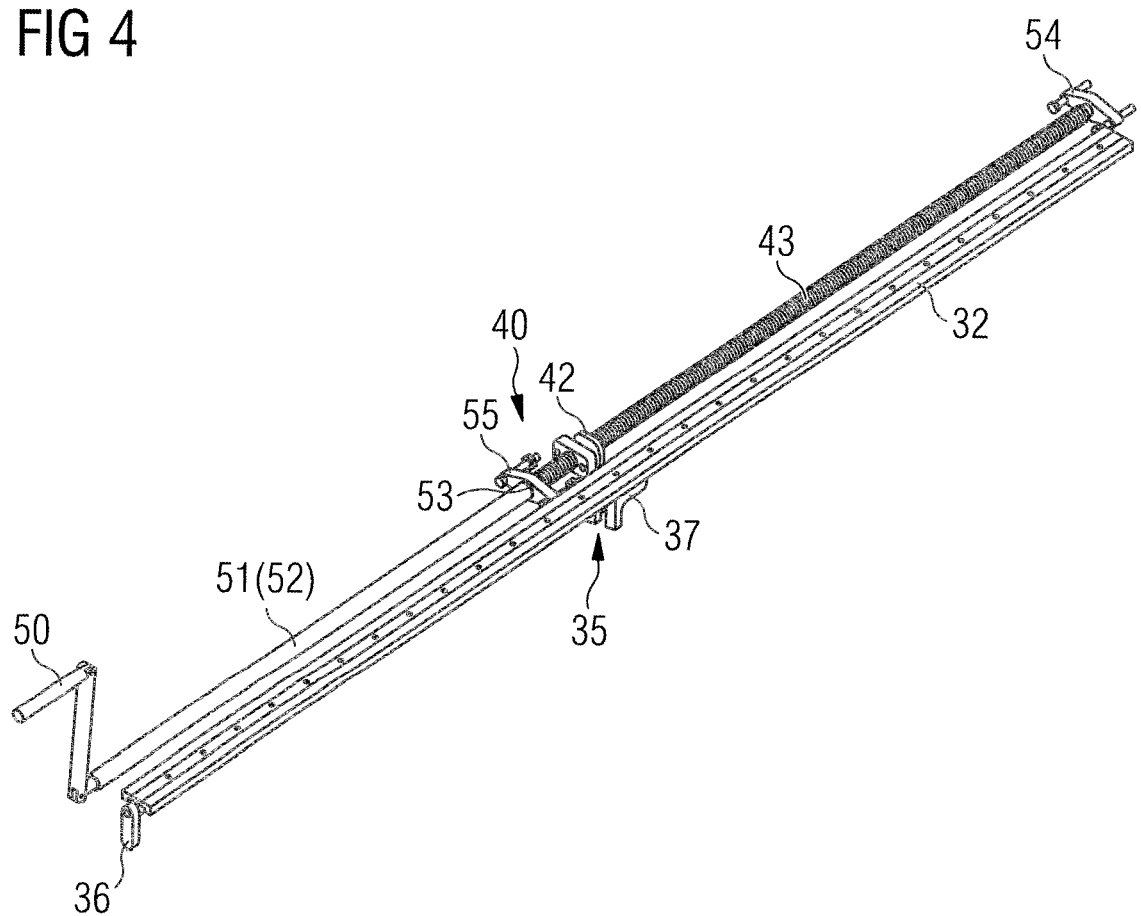
FIG. 4 is a perspective view from the front of the handling system according to the disclosure herein.

FIG. 4 is a perspective view of the handling system 30 according to the disclosure herein. The handling system 30 includes the linear guide 32 in which the driver assembly 35 comprising the front driver 36 and rear driver 37 is slidably mounted. The rear driver 36 is rigidly connected to a spindle nut 42 of a spindle drive 40. The spindle nut 42 can move linearly on a threaded spindle 43. In the embodiment shown, the spindle drive 40 is driven by a hand crank 50 and a connecting rod 51. The rotational movement of the hand crank 50 and connecting rod 51 is used to convert this into a translational movement and thus move the driver assembly 35 inside the linear guide 32. For this purpose, the threaded spindle 43 is preferably designed as a trapezoidal spindle having a gradient of from 25 mm to 100 mm. This allows a linear movement which moves a full-size trolley 20 from the front parking space 14 to the storage position in the rear parking space 15, with correspondingly few rotations of the hand crank 50. A gradient of from 40 mm to 80 mm has proven to be preferable. The connecting rod 51 is connected to the threaded spindle 43 for conjoint rotation. The connecting element 53 is shown more accurately in FIG. 9.

Figure 5:
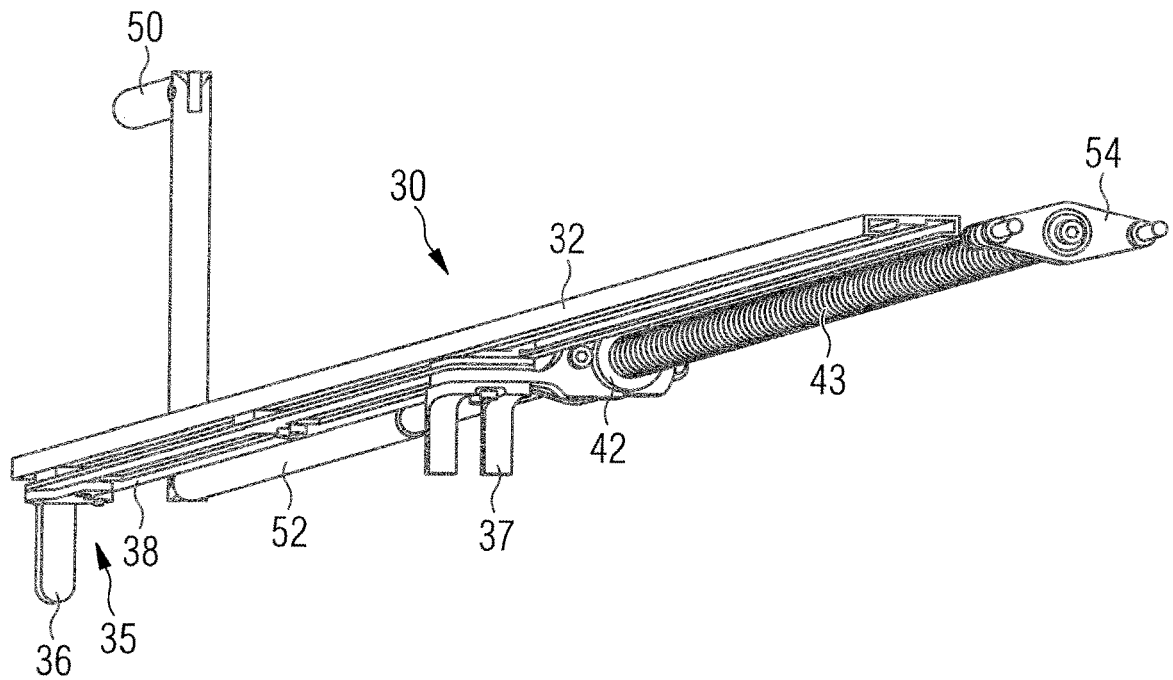
FIG. 5 is a perspective view from the rear of the handling system according to the disclosure herein.
Figure 6:
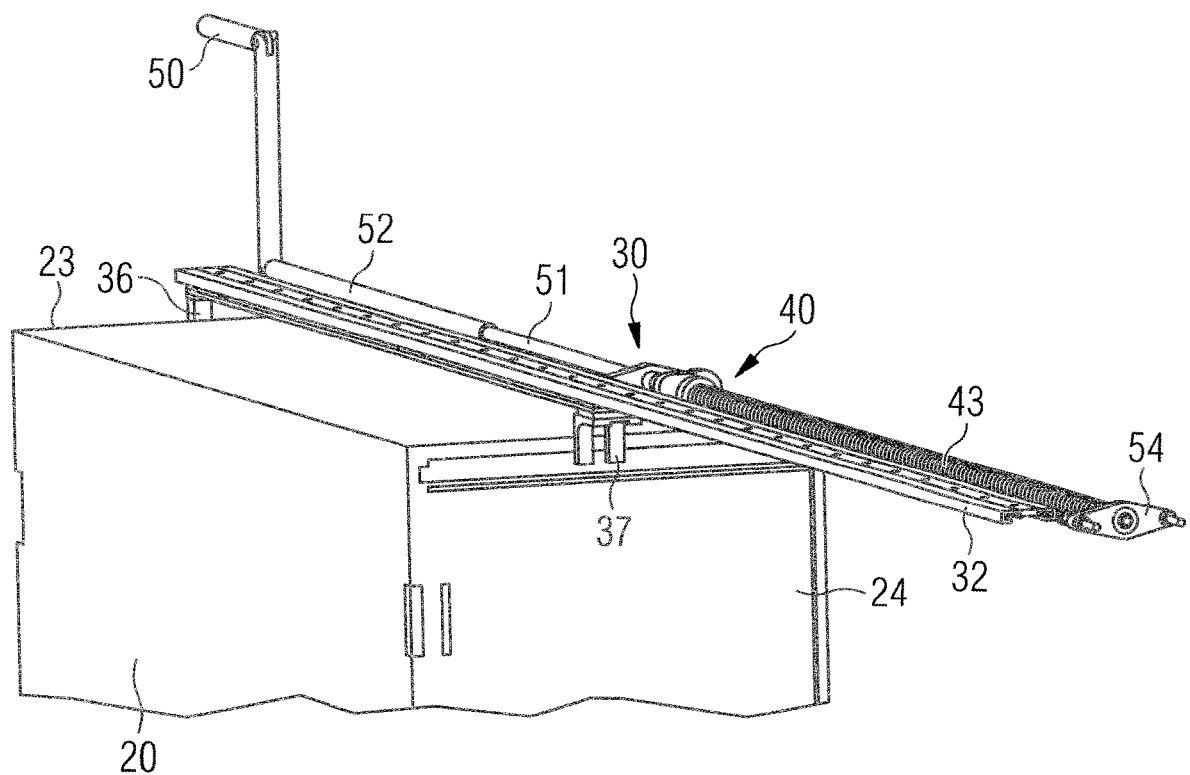
FIG. 6 is a perspective view from the rear of the handling system according to the disclosure herein in an operative connection of a driver assembly with the supply container.

FIG. 5 is a perspective view from the rear of the handling system 30 according to the disclosure herein, and FIG. 6 is a perspective view of the handling system 30 according to the disclosure herein in an operative connection of drivers 36 and 37 to the supply container 20. It is apparent that the drivers 36 and 37 are interconnected by the carrier plate 38 in such a way that they correspond to the depth of a supply container 20, and thus the front driver 36 can act on the front wall 23 of the container 20, and the rear driver 37 can act on the rear container wall 24. Safe guidance of the supply container 20 by the driver assembly 35 is thereby achieved.

Figure 7:
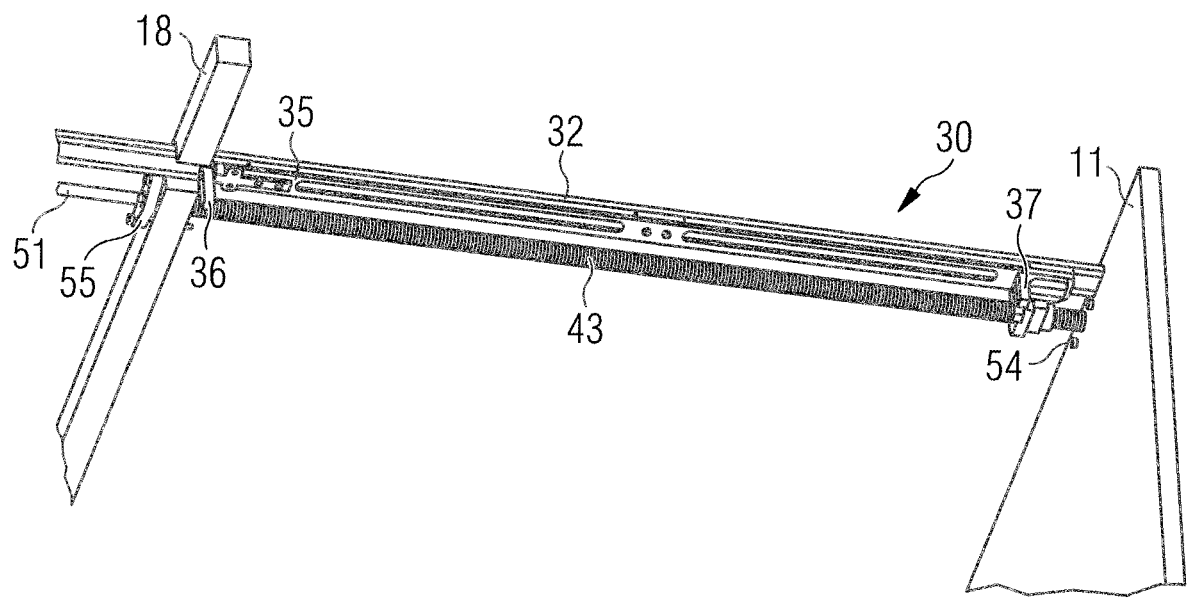
FIG. 7 shows one embodiment of the handling system according to the disclosure herein with the detail of the driver assembly.

FIG. 7 shows one embodiment of the handling system 30 according to the disclosure herein with the detail of the driver assembly 35. Furthermore, it can be seen how the handling system 30 can be integrated in the receiving space 10. For this purpose, a view of the handling system 30 from below is shown. The handling system 30 is attached firstly in the rear part of the receiving space 10 in the region of the rear wall 11. The linear guide 32 and the spindle drive 40 comprising the threaded spindle 43 extend in the movement direction of the catering container 20 substantially in parallel underneath the cover plate 19 (not shown in this drawing). The threaded spindle 43 is rotatably fixed to the rear wall 11 by an attachment fitting/flange bearing 54. The threaded spindle 43 is mounted on the lower surface of the cover plate 19, for example on a carrier element 18, by an additional flange bearing 55. In addition to the fixing to the rear end, the threaded spindle 43 is mounted on the carrier element 18 in the central region of the receiving space 10. The position of the additional flange 55 on the lower surface of the cover plate 19 is selected according to the length of the required movement path of the driver assembly 35, which is directly dependent on the depth of the receiving space 10 and the depth of the container which is to be stored and to be moved using the handling system 30.

Figure 8:
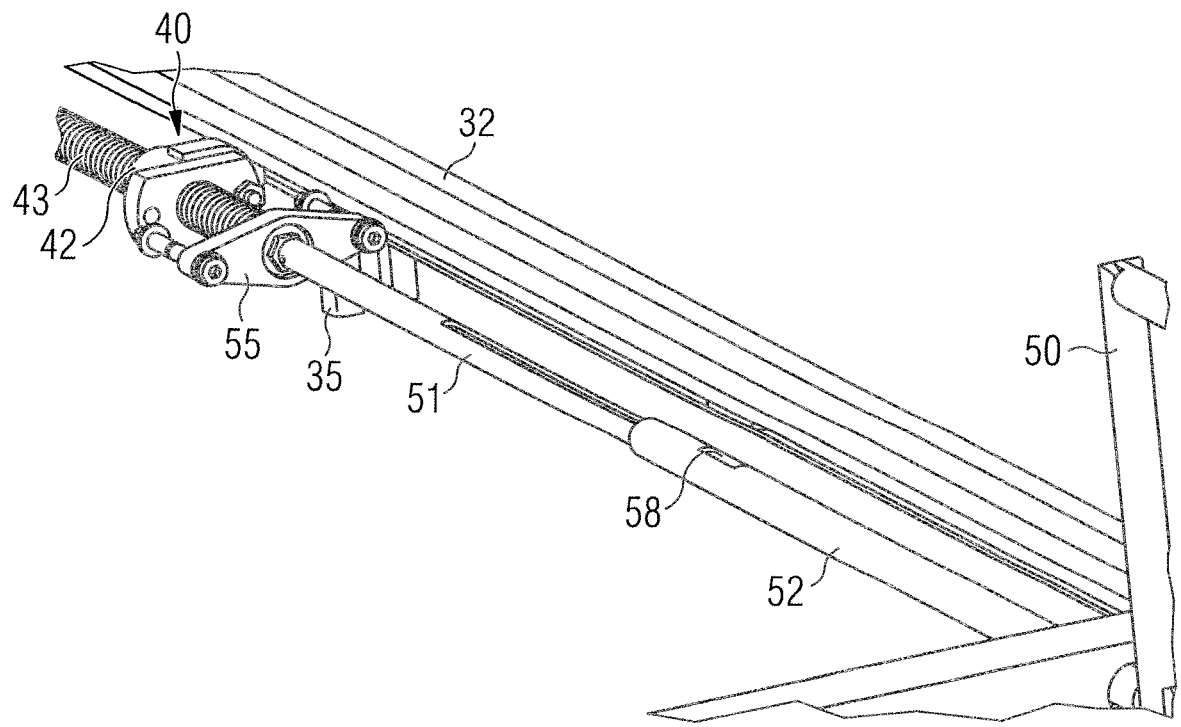
FIGS. 8 and 9 are perspective views of the spindle drive in further details.
Figure 9:
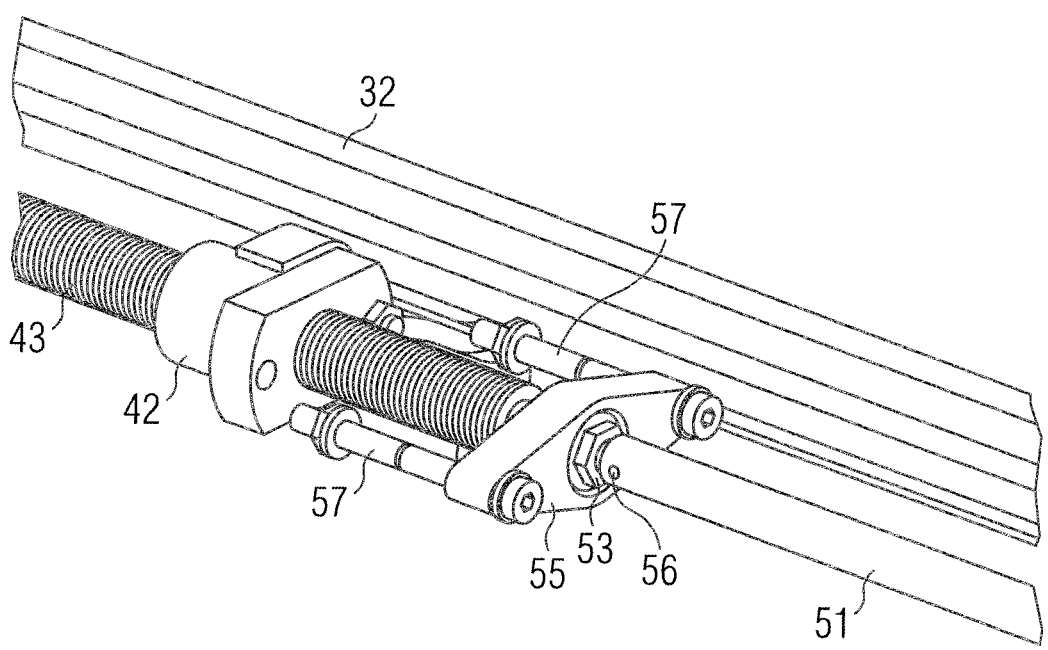

FIGS. 8 and 9 are perspective views of the spindle drive 40 in further details. The threaded spindle 43 is connected to the connecting rod 51 for conjoint rotation. For this purpose, the threaded spindle 43 and the connecting rod 51 are connected by a threaded connection 53 and secured with a peg 56. The mounting of the front end of the threaded spindle 43 is made possible by the flange bearing 55. The flange bearing 55 is attached to a carrier element 18 (see FIG. 7) by attachment elements 57. The carrier element 18 can also be replaced with a direct attachment of the flange 55 to the lower surface of the cover plate 19. The spindle nut 42 is moved linearly along the threaded spindle 43 by the rotational movement of the connecting rod 51 by actuating the hand crank 50, and thus slides the driver assembly 35 in the linear guide 32. FIG. 8 shows one particular embodiment of the connecting rod 51 and the hand crank 50. In order to stow the hand crank 50 when not in use, the connecting rod 51 can have a telescopic design. For this purpose, a connecting rod tube 52 is connected to a hand crank 50 having a foldable design. The connecting rod tube 52 is connected to the connecting rod 51 for example by a key-and-groove connection 58. When the hand crank 50 is not in use, the connecting rod 51 can be inserted in the connecting rod tube 52. Alternatively, the hand grip 50 can also be designed to be removable and stowed in the galley in an access region which is easy for the flight attendants to access.

Figure 10:
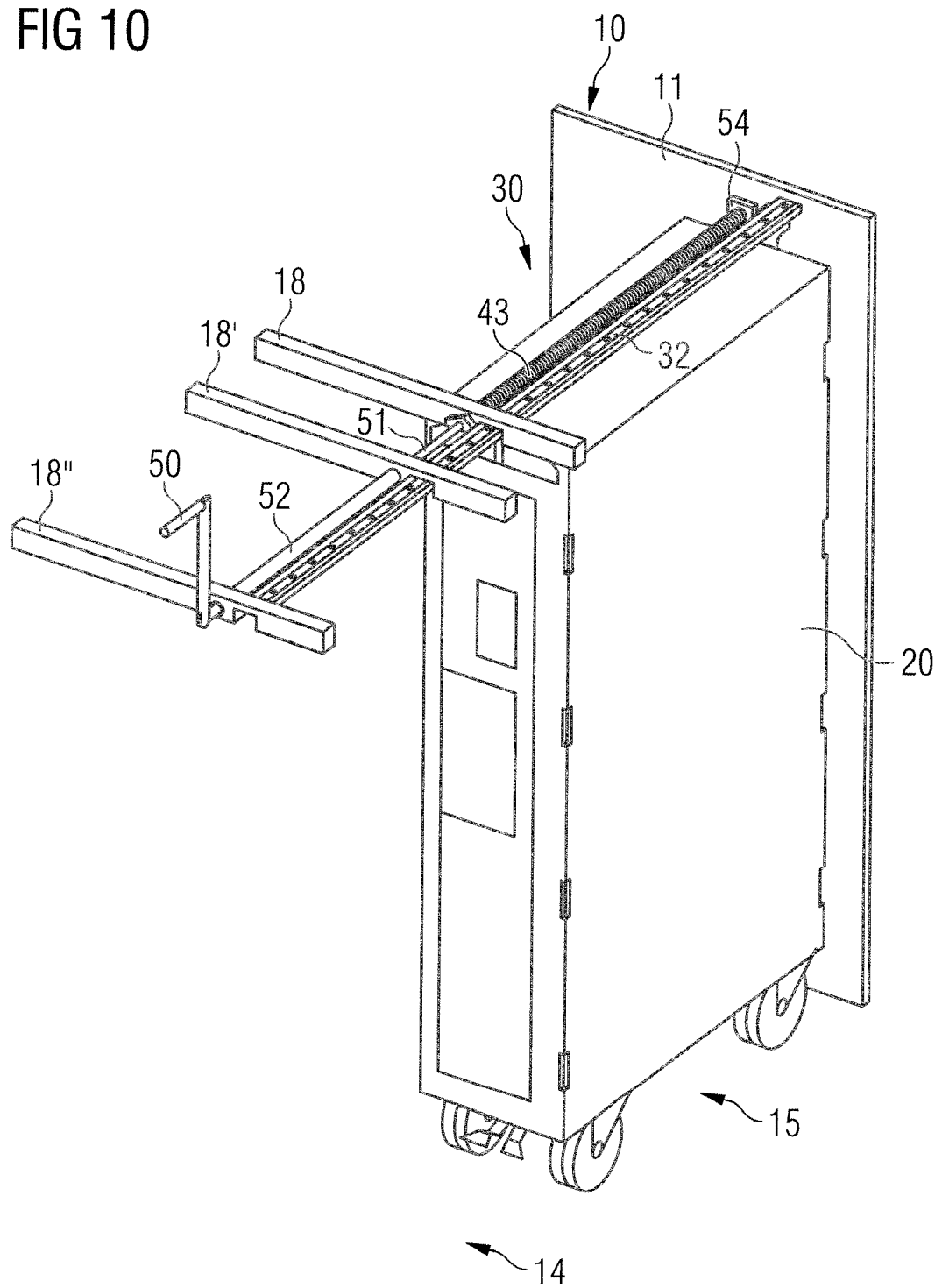
FIG. 10 shows the supply container in the rear parking space of the receiving space in operative connection with the handling system.

FIG. 10 is a perspective view of the supply container 20 in the rear parking space 15 of the receiving space 10 in operative connection with the handling system 30. The receiving space 10 is represented only by the rear wall 11 and parts of the cover plate 19, represented here by carrier elements 18, 18' and 18". The carrier element 18 is provided as an attachment point for the front flange bearing 55 for mounting the threaded spindle 43, and the carrier element 18' is provided as an attachment point for the connecting rod tube 52. The carrier element 18" represents the leading edge of the cover plate 19, which also contains at least one attachment point for the connecting rod tube 52 and the linear guide 32.

In the following drawings 11 et seq., a handling system 300 according to a second embodiment is shown. In this case, the supply container 20 is shown in operative connection with the handling system 300 arranged on a side wall 130 of the receiving space 100. This can be advantageous if, as a result of construction restrictions, there is little or insufficient installation space available between the supply container 20 and the cover plate 19. The handling system 30 according to the first embodiment can also be provided on a side wall 130. Corresponding positions can also be provided according to the available installation space.

Figure 11:
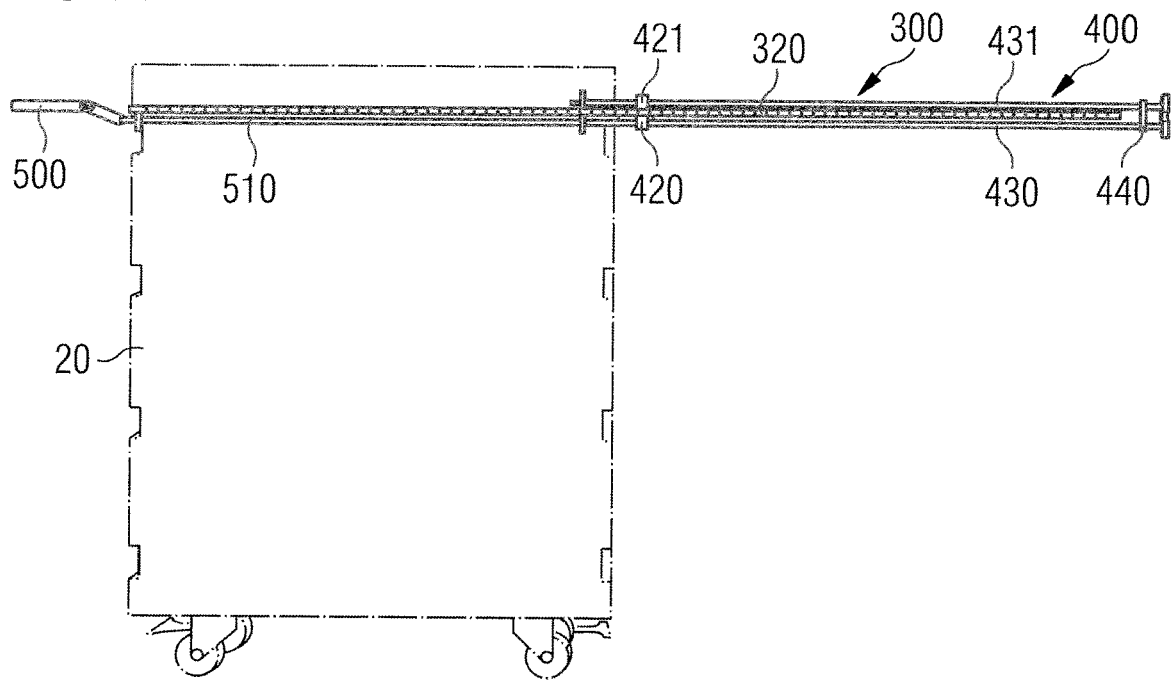
FIG. 11 is a side view of the handling system according to the disclosure herein in a second embodiment.
Figure 12:
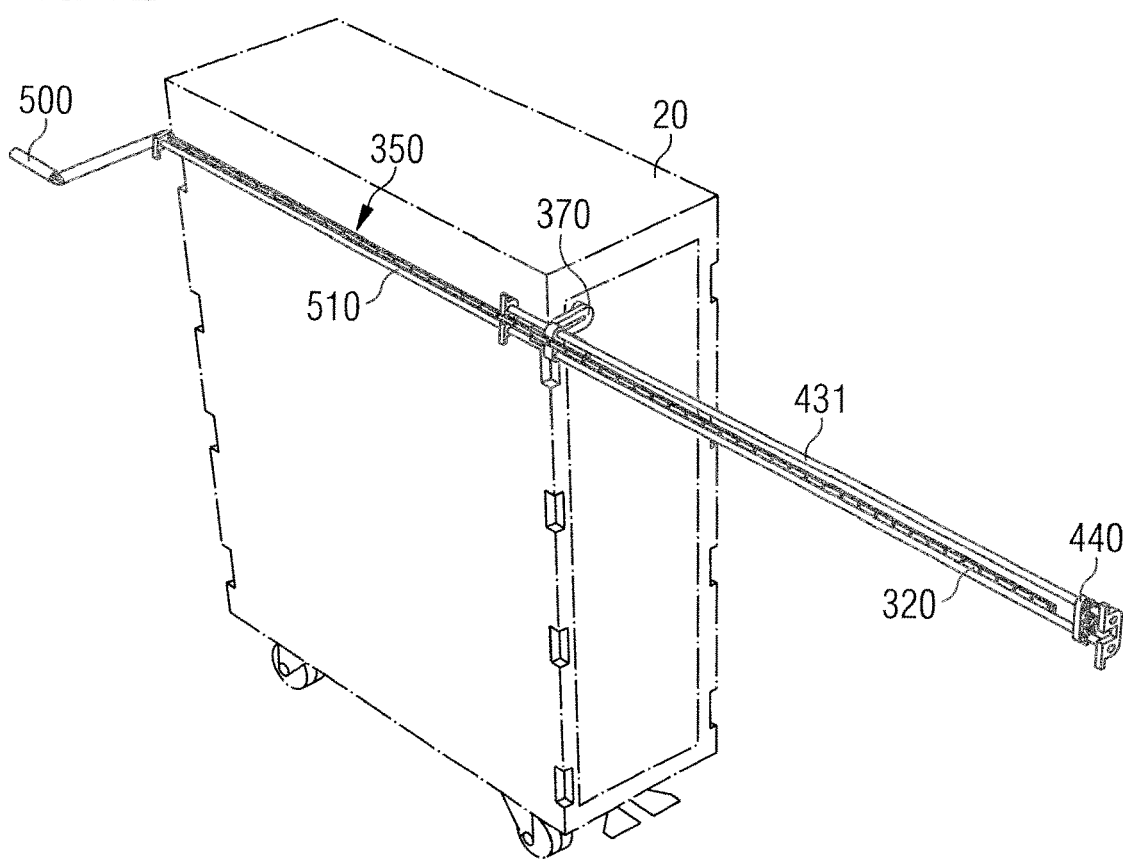
FIG. 12 is a perspective view of the handling system according to the disclosure herein according to the second embodiment.

FIG. 11 is a side view of the handling system 300 according to the disclosure herein, and FIG. 12 is a perspective view of the handling system 300 according to the disclosure herein. The operating principle of the handling system 300 with a spindle drive 400 and a linear guide 320 is substantially the same as with the above-described system according to the first embodiment shown in FIGS. 1 to 10. Due to the structural displacement of the system 300 into the side wall region of the receiving space 10, a narrower design is advantageous, which is associated with a change to the spindle drive 40. However, this is to be dimensioned on the basis of the loads to be taken into account, occurring forces and torques, and handling forces to be used. The spindle drive 400 according to the second embodiment is equipped with two threaded spindles 430, 431 which are operatively connected by a gear drive 440. An easier construction may be achieved thereby. By a connecting rod 510 and a hand crank 500, a driver assembly 350 is moved along the guide rail 320. For this purpose, the spindle nuts 420 and 421 are provided in a rigid connection to the rear driver 360.

Further details are shown in the detail drawings according to FIGS. 13 to 17 and are described in the following.

Figure 13:
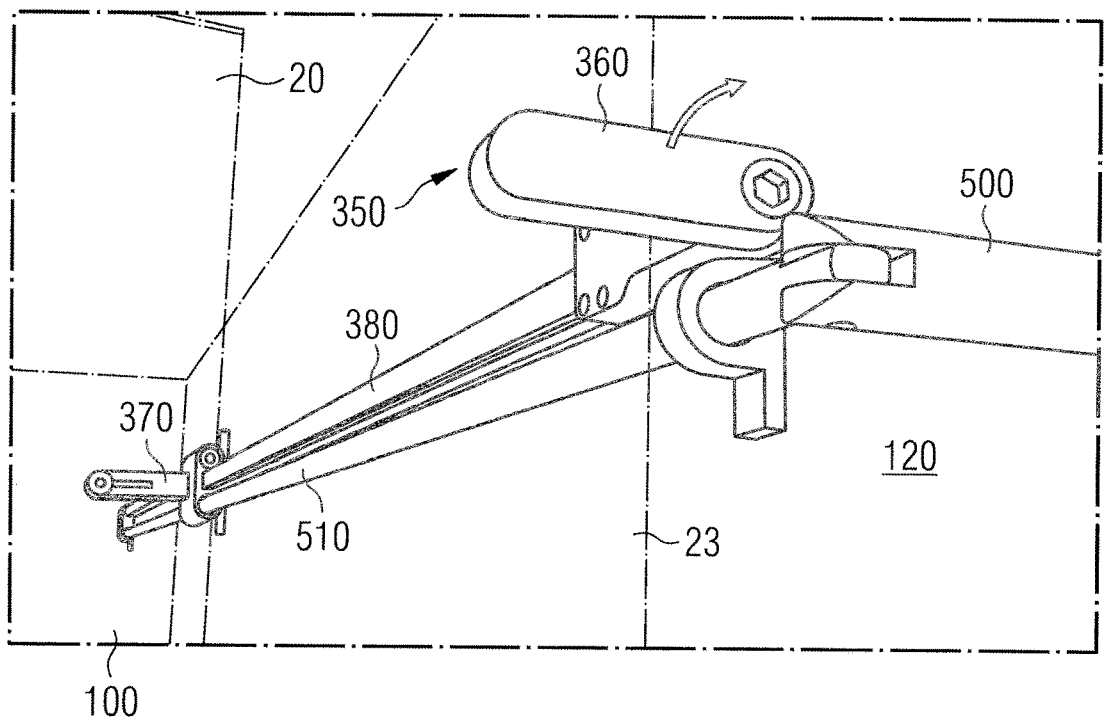
FIGS. 13, 14, 15 and 16 are perspective views of the handling system in further details.
Figure 14:
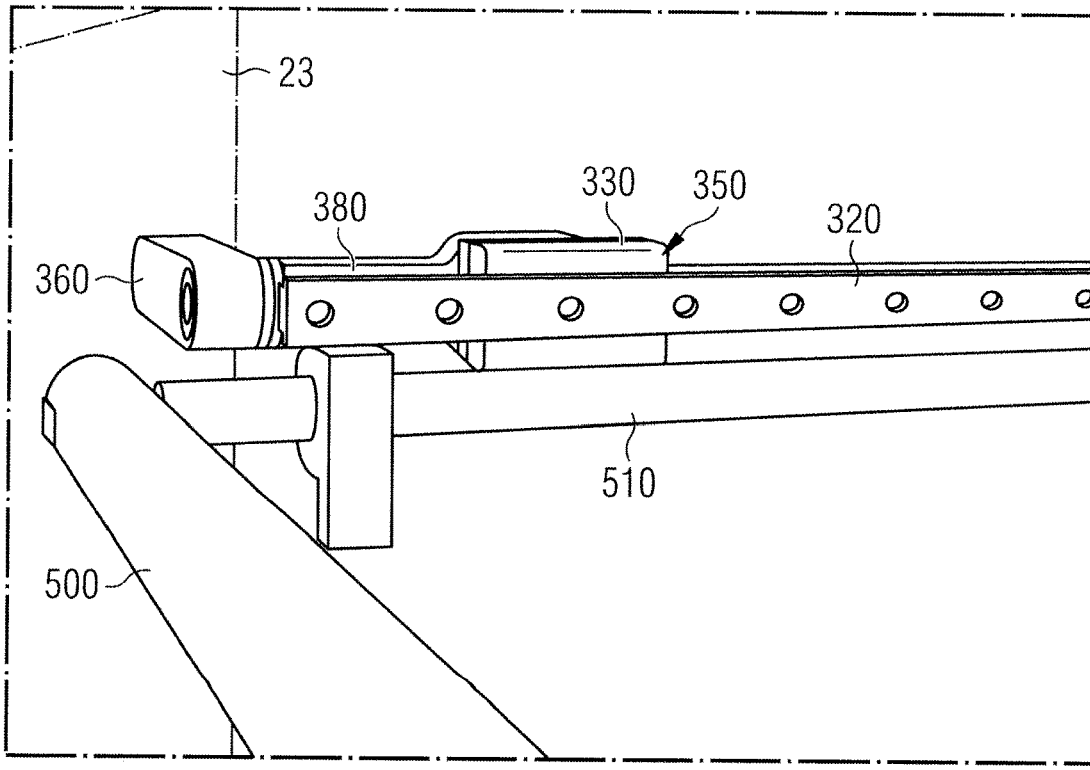

In FIGS. 13 and 14, the driver assembly 350 is shown as a component of the handling system 300 in detail drawings. The handling system 300 is attached to the side wall 120 of the receiving space 100. The driver assembly 350 is moved on the linear guide 320 by movement carriages 330. For this purpose, a carrier plate 380 is provided which connects the front driver 360 to the rear driver 370 and also rotatably mounts the front driver 360. The carrier plate 380 is preferably in the form of a strip in order to hold the corresponding drivers 360 and 370 along the longitudinal extent of the supply container 20. The front driver 360 can be rotated into an abutment position against the front wall 23 of the container 20 after the supply container 20 is inserted in the receiving space 100. The supply container 20 is then moved by the driver assembly 350 into the storage position thereof, or from the storage position into the removal position. When the removal position of the supply container 20 is reached, then the driver 360 is rotated in such a way that it comes out of the travel path of the supply container 20, and the supply container 20 can be removed.

Figure 16:
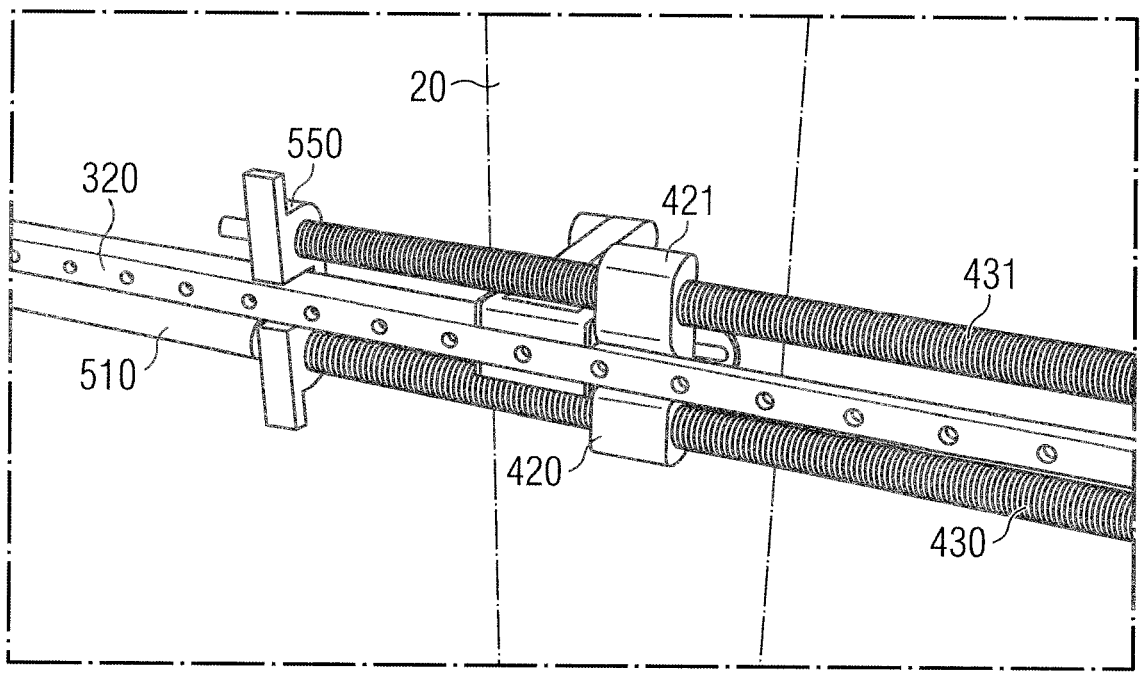
Figure 17:
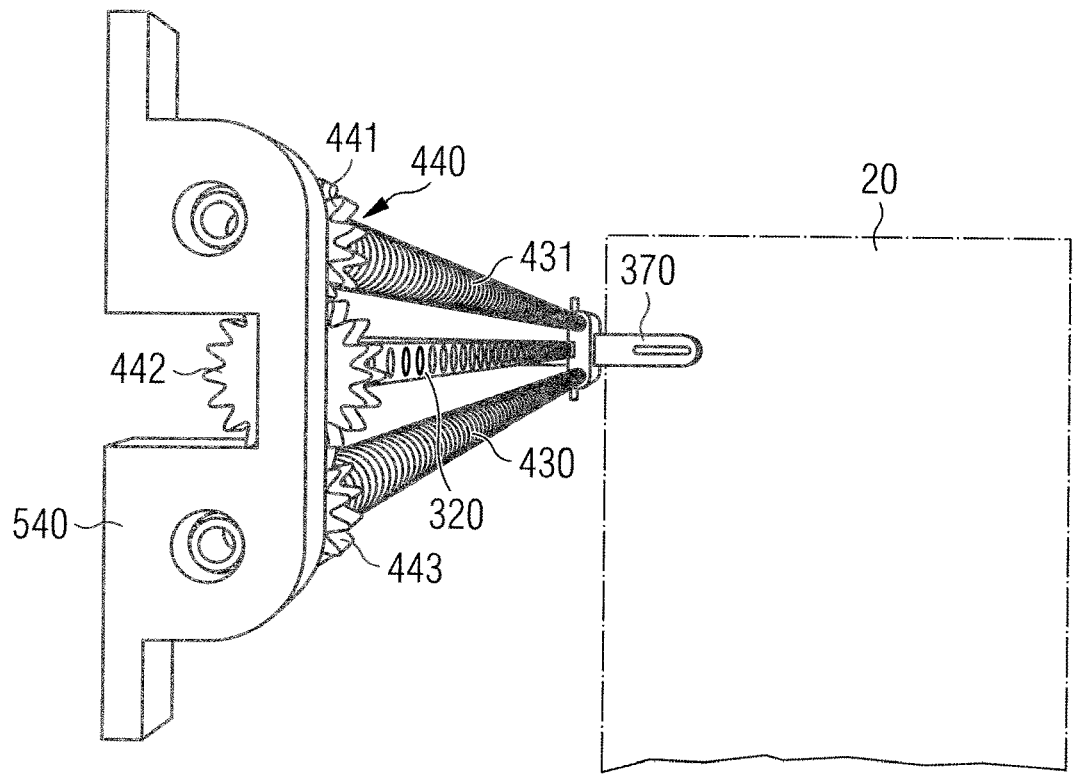
FIG. 17 is a perspective view of the embodiment of a gear drive in the use for the spindle drive of the handling system according to the second embodiment.

In FIGS. 15, 16 and 17, the detail of the spindle drive 400 is shown in greater detail in different views. The spindle drive 400 according to this second embodiment is equipped with two threaded spindles 430, 431 which are operatively connected by a gear drive 440. The two longitudinally extending threaded spindles 430 and 431, comprising an interposed linear guide 320 extending substantially in parallel with the threaded spindles, can have smaller dimensions than the threaded spindle 43 according to the first embodiment for the movement of the supply container 20. Part of the driver assembly 350, in particular a rear driver 370, is positioned between the spindle nuts 420, 421. As a result of this arrangement of the fixed driver 370 between the spindle nuts 420, 421, high moments that could act on the driver 370 when the supply container 20 is slid can be prevented.

FIG. 15 further shows the rear driver 370 in an adjustable embodiment. By a slot, a precise positioning between the spindle nuts 420 and 421 can take place. A bumper 371 is also provided which provides protection during abutment against the rear wall.

FIGS. 16 and 17 further show the attachment fittings 540 and 550 for mounting the two threaded spindles 430 and 431. In the embodiment shown, these fittings 540 and 550 are attached to the side wall of the receiving space 100. However, it is also possible to arrange the handling system 300 according to the second embodiment in the ceiling region of the receiving space 100. This is conceivable as an alternative depending on the available installation space.

FIG. 16 further shows the connection of the connecting rod 510 to one of the threaded spindles for conjoint rotation, shown here with the threaded spindle 430. The rotation of the second threaded spindle 431 is ensured by the gear assembly 443, 442 and 441, which can be seen in FIG. 17.

By the components shown, a simple but still very effective handling system can accordingly be produced which can considerably increase the compactness of a galley or other devices, since a parking space having a sufficient depth can be filled with a plurality of trolleys one behind the other, without having to take into account restrictions resulting from handling by a user having an average body size.

Figure 18:
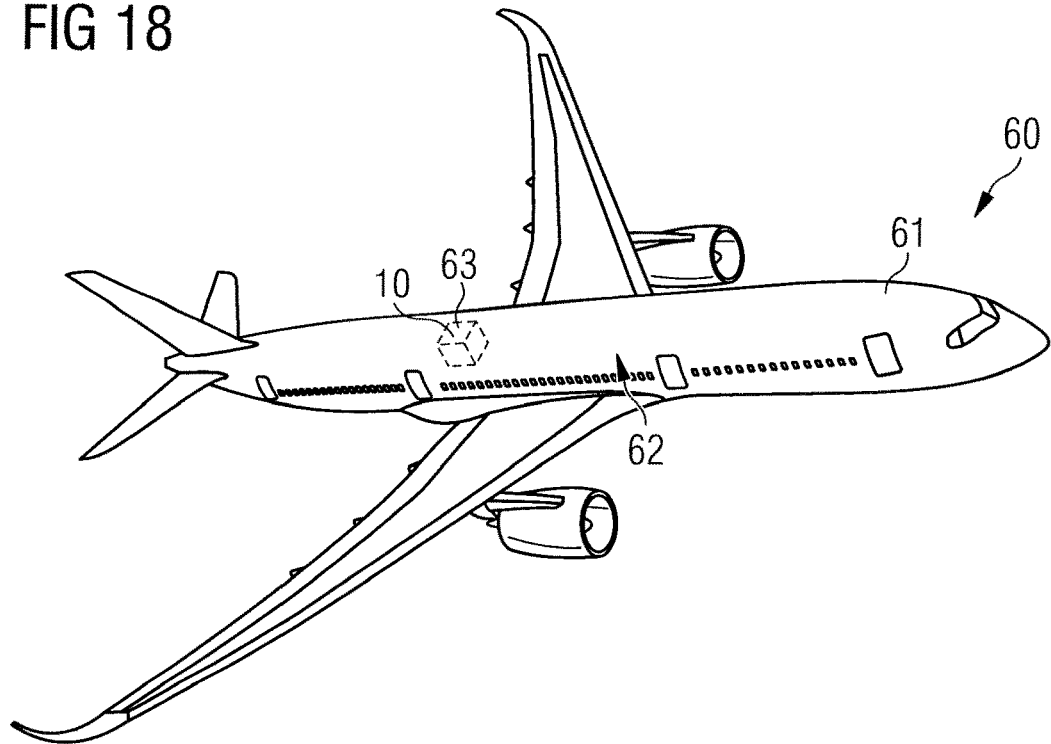
FIG. 18 shows an aircraft comprising a cabin in which a galley having a receiving space is arranged, equipped with a handling system according to the disclosure herein.

Lastly, FIG. 18 shows an aircraft 60 comprising a fuselage 61 and a cabin 62 formed therein, in which a cabin monument 63 can be arranged, which has a receiving space 10 for supply containers and is equipped with a handling system 30 according to the disclosure herein. Preferably, the receiving space 10 is a component of a galley of a commercial aircraft, and the cover plate 19 can simultaneously be used as a worktop in the galley.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority. Reference signs in the claims are not to be considered a restriction.

The invention claimed is:

1. A handling system for containers in a receiving space, comprising:
    a linear guide configured to be arranged on a side wall or a lower surface of a cover plate of the receiving space, wherein the linear guide guides at least one driver element in a movement direction of the container between a storage position in which a rear wall of the container is arranged in a region of a rear wall of the receiving space and a removal position in which the container is arranged in a region of an insertion opening, arranged opposite the rear wall; and
    the at least one driver element being operatively connected to at least one spindle nut of a spindle drive which is configured to linearly move the container between the storage position of the container and the removal position of the container;

wherein the at least one driver element comprises a front driver and a rear driver, wherein the rear driver is connected to the front driver via a supporting plate; and wherein the at least one driver element is movable in the linear guide.

2. The system according to claim 1, wherein the receiving space is configured with a front parking space and a rear parking space for receiving at least two of the containers arranged one behind another, wherein the linear guide is configured to extend substantially from the insertion opening in the region of the front parking space substantially as far as the rear wall of the receiving space.

3. The system according to claim 1, wherein the spindle drive comprises at least one threaded spindle.

4. A handling system for containers in a receiving space, comprising:

a linear guide configured to be arranged on a side wall or a lower surface of a cover plate of the receiving space, wherein the linear guide guides at least one driver element in a movement direction of the container between a storage position in which a rear wall of the container is arranged in a region of a rear wall of the receiving space and a removal position in which the container is arranged in a region of an insertion opening, arranged opposite the rear wall; and wherein the at least one driver element is operatively connected to at least one spindle nut of a spindle drive which is configured to linearly move the container between the storage position of the container and the removal position of the container; and wherein the spindle drive comprises two threaded spindles extending in parallel, between which the at least one driver element is mounted.

5. The system according to claim 1, wherein the front driver is rotatable or slidable.

6. The system according to claim 1, wherein the spindle drive is driven by a crank drive.

7. The system according to claim 6, wherein the crank drive comprises a connecting rod and a hand crank, and the connecting rod is connected to at least one threaded spindle for conjoint rotation.

8. The system according to claim 1, wherein the spindle drive comprises an electric motor.

9. A vehicle comprising a cabin and a cabin monument located therein, which has the handling system according claim 1.

* * * * *